United States Patent
Renner et al.

[15] 3,703,849
[45] Nov. 28, 1972

[54] MULTIPLE UNIT, HYDRAULIC ACTUATOR

[72] Inventors: Eskhard Renner, Achim; Udo Linnenbecker, Bremen, both of Germany

[73] Assignee: Vereinigte Flugtechnische Werke-Fokker GmbH, Bremen, Germany

[22] Filed: June 3, 1971

[21] Appl. No.: 149,614

[30] Foreign Application Priority Data

June 13, 1970  Germany..........P 20 29 287.9

[52] U.S. Cl..........................91/412, 91/171, 60/97 E
[51] Int. Cl...........................F15b 11/16, F15b 13/16
[58] Field of Search..........91/412, 411 R, 411 B, 171; 60/97 E, 97 L

[56] References Cited

UNITED STATES PATENTS 3,277,917  10/1966  Stow..........................91/171 X
3,618,470  11/1971  Mueller et al...............60/97 E Primary Examiner—Edgar W. Geoghegan
Attorney—Smyth, Roston & Pavitt

[57] ABSTRACT

A multiple unit, hydraulic actuator system with servo feedback control of each unit and superimposed pressure balance control so that for each common input command pressure in all units is equalized to an average value.

18 Claims, 3 Drawing Figures

Inventors:
Eckhard Renner
Udo Linnenbacker

MULTIPLE UNIT, HYDRAULIC ACTUATOR

The present invention relates to a device and apparatus for supervising and balancing operation of plural, electro-hydraulic drive units and actuators as operating upon a common output, each drive unit including a drive cylinder-piston arrangement controlled by a servo valve, the drive pistons of all units being rigidly interconnected.

Displacement and positioning control generally requires often a high degree of operational accuracy even in cases where the forces needed to obtain the displacement are quite high. This is particularly true, for example, in modern high power aircraft wherein control operations have to be carried out at a very high degree of accuracy. Different types of hydraulic actuators are known, but they all use servo valves controlling pressure in a drive cylinder to particularly displace the piston therein; the piston displacement is controlled by servo means, and multiple drives are usually established by mechanical combination of the outputs (piston rods) of at least two single drive units.

The operational accuracy of each single drive unit may be supervised by a simulator duplicating the operation of the drive unit but without load, and establishing a replica of operation by means of parallelly operating electrical and hydraulic elements. It was found, however, that there are limitations in this supervision by simulation. Not all disturbances and outside interferences that may act on such a drive unit can be properly simulated. Therefore, a deviation in the operation of such a single drive unit from normal can be recognized as fault condition or error only after having reached significant magnitude. Thus, the criteria for disconnecting a faulty unit from the system requires a considerably erroneous displacement. A displacement should not be recognized as error too early, otherwise there would be too frequently a turnoff of a single drive. On the other hand, it is undesirable to have the system advance into the error mode to a significant degree before correction; that may be outright dangerous. Moreover, the response criterium for disconnection of an individual drive remains the same, regardless of whether or not any of the other drives has been already disconnected.

Another point to be considered is that in plural drives of that type, the several servo valves are expected to have some tolerances and particularly in case these valves are electrically controlled, there may be differences in signal level (for the same command input). Thus, the several units must be expected to operate under some degree of imbalance and may, at times, tend to operate in opposing directions. Of course, the accuracy of the multiple drive system deteriorates in such a case, and even if a high gain feedback is employed for each unit, there is a limit as to operational improvement along that line, otherwise the feedback system may become unstable.

It is an object of the present invention to increase the accuracy of single and plural hydraulic drives even if the individual drive unit has wide tolerances whereby particularly errors are to be avoided as they may affect a common output. Furthermore, equipment is to be provided which continues to supervise the remaining drives after a faulty one has been disconnected.

In accordance with the present invention, it is suggested that the pressure as prevailing in the respective cylinders of all drive units act on a hydraulic balancing system and in case a pressure difference is monitored, the individual drive units receive a control signal from the balancing system so as to provide control operations tending to equalize the pressure. In case the differences in pressure between the drive cylinders cannot be eliminated, development of the control signal by the balancing system causes the faulty drive unit to be disconnected.

It is a feature of the invention that the hydraulic balancing system operates in such a manner that each drive cylinder serves as operational simulator for any other drive cylinder within the multiple unit system so that in effect each drive unit is supervised by all the others. Moreover, the supervisory operation is maintained even after one faulty drive unit is disconnected, each individual remaining unit is then still supervised by the remaining others.

The hydraulic balancing system has as many cylinders with inserted pistons as there are drive units to be supervised. The hydraulic pressure of a drive cylinder acts, for example, on the respectively associated balancing piston from above. The lower side of the piston is acted upon by pressure of a secondary hydraulic system that establishes the respective necessary control and compensating signal; the secondary system, for example, being a common oil cushion. Alternatively, the secondary system may comprise plural, individual chambers, operatively interconnected to maintain constant pressure. In either case, a hydraulic displacement is produced by this balancing system to be used for pressure equalizing control in the drive units.

The control device that receives the signal from the balancing system for purposes of offsetting pressure differences in the cylinders of the individual drive units, may have any suitable configuration. Generally speaking, the drive units are each provided with a stabilizing feedback system; using actual drive piston displacement as feedback signal; a follower control responds additionally to a common command signal that serves as reference signal for and in all feedback loops individually closed through the respective servo valves. The balancing control signal is introduced in each feedback loop modifying operation thereof in a manner that will result in pressure equalization for the drive cylinders in all units, unless imbalance is the result of a defect that cannot be corrected, or that would require correction to such an extent that the overall operation produces incorrect output.

In accordance with a particular advantageous and preferred embodiment of the invention, it is suggested to provide an auxiliary cylinder for each drive cylinder and the auxiliary cylinder receives a piston with a piston rod introducing a particular control into the feedback for the respective drive cylinder and piston. The piston of an auxiliary cylinder is, on one side, under operating pressure of the respective drive cylinder, while the other side of the auxiliary piston is acted upon by the hydraulic balancing system. In the case of a pressure differential among the several drive cylinders there will automatically result a compensating signal in form of a displacement by the balancing system which acts uniformly on all of the auxiliary cylinders. However, each auxiliary piston is acted upon from the other side by the pressure in the particular drive cylinder, so that the resulting displacement of each auxiliary piston may differ. Each auxiliary piston introduces correction into the respective feedback loops; the corrections are effective in opposite directions as far as pressure imbalance in the several drive units is concerned.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
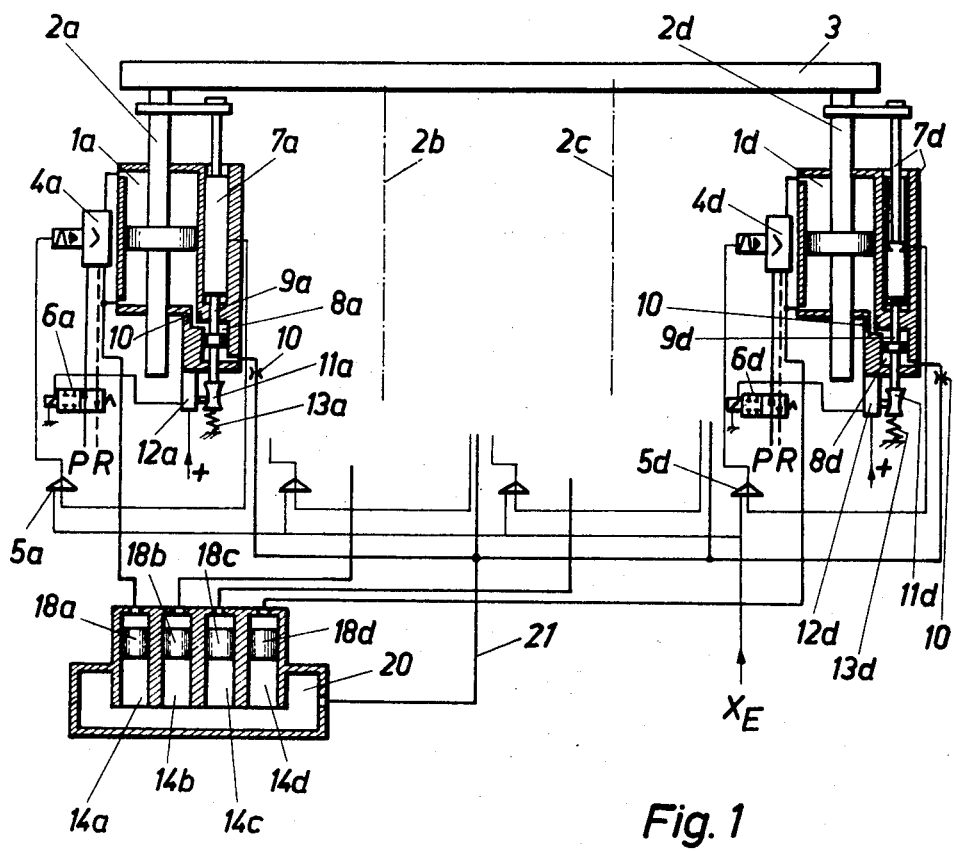
FIG. 1 is a somewhat schematic hydraulic diagram with cross section view into several drive units of a quadruplex drive system.

Proceeding now to the detailed description of drawings, there is illustrated a four-unit system, having four drive cylinder piston arrangements accordingly. For reasons of simplification only, two of the drive units, $1a$ and $1d$, are shown in greater detail, the others are constructed analogously. Each unit has a cylinder with a piston displaceably positioned therein, the piston being connected to a piston rod; there are piston rods $2a$ through $2d$ accordingly. A crossbar, actuator bar or yoke 3 interconnects all four piston rods, and the displacement of yoke 3 constitutes the common output of the quadruplex system, each drive unit contributing (ideally) one-fourth of the required displacement force.

Associated with each drive unit is a servo valve. There are illustrated servo valves $4a$ and $4d$ respectively, the others are provided analogously. Each servo valve governs pressure above and below the respective operating drive piston. Each servo valve connects to electric circuitry and receives electric signal derived respectively from the outputs of four comparing circuits $5a$ through $5d$. In case of, e.g., a positive comparator output, the respective servo valve pressurizes the drive cylinder from above and vents the chamber below the respective drive piston to cause down displacement. If the comparator output is negative, the operation is in the reverse direction. The servo valves themselves receive pressure fluid via disconnect or master valves $6a$ to $6d$, one for each unit. Each disconnect valve is capable of deactivating the respective servo valve for disconnecting the respective drive unit and preventing its further participation in the positioning control of actuator bar and yoke 3 for example, through interconnecting upper and lower chambers of the respective drive unit cylinder.

Each piston rod, $2a$ through $2d$, is linked additionally to a feedback transducer, such as the movable contact or tap of potentiometers $7a$ through $7d$. The resistive track of each potentiometer is suitably biased. An output line for each potentiometer connects respectively to one input each of comparing circuits $5a$ through $5d$. The output signal, thus, extracted from each potentiometer has value representative of deviation of the respective drive piston from a central or neutral position. These signals are the positional feedback signals for each unit. All units operate under a common command. Therefor, a command signal $X_E$ is fed to each comparator $5a$ through $5d$ as the respective second input thereof in representation of the desired displacement of actuator yoke 3.

Therefore, there is provided for each unit a closed loop leading from a drive piston rod via potentiometer, such as $7a$ through $7d$, to the respective comparing circuits $5a$ through $5d$ and from there to the respective servo valves $4a$ through $4d$, so that each servo valve operates the respective drive unit under command of signal $X_E$ as applied to the comparator until balance is restored in the input circuit of each comparator by operation of the feedback loop. That balance, however, does not necessarily result in balanced operation of yoke 3 by all four drive units. In particular, it does not mean that all connecting points of the piston rods to the common actuator 3 have undergone precisely similar displacement, nor does it mean that all four drive units have taken up equal load for the displacement. Instead, one or two units may have attempted to move too far or not far enough, so that they acted in parts as load for the others. That, in turn, materializes in unequal pressure in the several units. The supervising equipment to be described next eliminates such imbalance.

The potentiometers themselves are of complex construction. Not only do they have a movable glider or tap (as is conventional) but their resistive track is likewise displaceable. For this, there are provided plural auxiliary cylinders, $8a$ through $8d$, one each per drive unit $1a$ through $1d$. Each auxiliary cylinder contains a piston with a piston rod, $9a$ through $9d$, and the resistance tracks of the several potentiometers are respectively connected to the piston rods $9a$ through $9d$. The auxiliary cylinders are connected, respectively on one side of the respective piston therein, to the respective drive cylinder, via chokes or throttling devices 10 for damping pressure transfer from the respective drive cylinder to the auxiliary chamber and vice versa. The other side of each auxiliary cylinder connects to a hydraulic balancing system to be described shortly.

Each auxiliary piston rod $9a$ through $9d$ connects to a cam, $11a$ through $11d$, respectively, for respective operation of a switch, $12a$ through $12d$. These switches operate disconnect valves $6a$ through $6d$ respectively. In case an auxiliary piston is forced into an upper or lower limit position, the respective cam track ($11a$ through $11d$) actuates the respective switch, $12a, \ldots, 12d$, and the respective disconnect valve closes thereby effectively disconnecting the respective drive unit from the hydraulic supply and the unit no longer participates actively in the operation. Springs $13a$ through $13d$ stabilize the positions of the respective piston rods.

The hydraulic balancing system 20 includes four cylinders, $14a$ through $14d$. Each balancing system cylinder contains a piston $18a$ through $18d$. These pistons are acted upon on one side by the pressure in one of the drive cylinders. Thus, the drive cylinder of unit $1a$ is connected to one side of cylinder $14a$ to act on piston $18a$ etc. The other ends of the balancing cylinders are in communication with a fluid reservoir. The balancing pistons are acted upon from the respective other side by the liquid of that reservoir acting as an oil cushion. Displacement of the reservoir liquid and oil cushion represents displacement of the respective balancing cylinders. This oil cushion is in communication via conduit 21 with the other side of all auxiliary cylinders 8a through 8b to act on all auxiliary pistons from below. The conduit system 21 includes throttles 10 for each connection to the several auxiliary cylinders.

The system illustrated in FIG. 1 operates as follows. Initially, the master control valves 6a through 6d are turned on and provide pressure fluid to the servo valves 4a through 4d respectively. In the neutral or normal state, these servo valves have central positions and, therefore, close the cylinders 1a through 1d. The drive pistons in the units 1a through 1d have also assumed central positions, as illustrated. The feedback signals are zero for each unit, and it may be assumed that the command signal $X_E$ is likewise at the zero signal level. The output of each comparator is zero as there is balance at the inputs. The neutral state is, therefor, actively maintained.

Now, it is assumed that a (nonzero) reference signal $X_E$ is applied, concurrently and of equal amplitude to one input each of all comparators 5a through 5d. Therefore, the output of these comparators unbalance in the same direction, and they cause the servo valves 4a through 4d to operate fluid passage into the drive cylinders to move the drive pistons in unison, in one particular direction. The displacement of the drive pistons is transmitted directly to the slide contacts or taps of the potentiometers 7a through 7d. Therefore, each potentiometer permits extraction of an electrical signal that is proportional to the instantaneous deviation of the respective drive piston from neutral or central position. The potentiometer outputs are respectively fed back to comparators 5a through 5d.

The comparators keep the servo valves open as long as the previously established imbalance persists at the inputs. As soon as the feedback signal, being representative of the actual position of the respective drive piston, equals the reference value, the respective servo valves closes, and the displacement of a particular drive piston stops. Now, ideally, all four drive pistons have been displaced uniformly, and all four drive pistons have stopped concurrently, in perfect uniformity, and in the same displacement position, so that their common actuation of actuator yoke 3 is uniform indeed. However, as was outlined above, there are tolerances in the construction and in the transfer functions. As a consequence, the control valves will not stop the drives strictly simultaneously and pressure differences remain or are set up in the drive cylinders so that the total drive power for the actuator output is reduced; the participation in the displacement control of yoke 3 is not uniform, and the accuracy of the position control is incorrect to some extent accordingly. Moreover, unequal wear will cause performance to deteriorate further in time. In addition, there may be other errors, so that the whole device does not operate in accordance with an accurately determinable transfer characteristic.

Now, we turn to the description of operation of the supervisory system, provided by the supplemental balancing system in accordance with the invention. First of all, as stated, each drive cylinder is associated with and connected to a balancing cylinder 14a etc. to act on the respective piston 18a etc. of the hydraulic balancing system 20. Therefore, if the pressure changes in each of the several drive cylinders uniformly, the same is true as to the action on the auxiliary pistons in cylinders 8a through 8d from either side. Thus, the balancing fluid in the oil reservoir of system 20 will not be displaced.

Now, it may occur that the pressure in one of the drive cylinders differs from pressure in the others. Particularly, this may already occur during drive displacement and may be prevalent in that the particular drive stops while the others still displace their respective drive rods or vice versa. As a consequence of this pressure difference, one of the pistons 18a through 18d changes position relative to the others, and the corresponding auxiliary piston 8a through 8d is likewise displaced. As a consequence, the balancing system displaces the other balancing pistons and the other auxiliary pistons, but in opposite direction as in the respective incorrectly operating unit. As a result of this hydraulic balancing action, there will be a displacement of the resistive tracks of the potentiometers, so that the signal relations in the electric input circuits for the several comparators are no longer uniform. The resulting control action, through operation of the servo valves, causes the pressure differential among the several drive cylinders to drop below a permissible limit. Pressure equalization among the several drive cylinders restores approximately the original condition of balance in the balancing system.

It can be seen that the device operates in a manner that eliminates errors, in that the balancing equipment operates to average the errors. Above it was assumed that one unit operates somewhat incorrectly. In reality, several of them may operate incorrectly, as each unit may exhibit some tolerance and deviation from ideal and rated values. It is, in this sense, that for any individual unit the composite operation of all respective other drive units serves as reference, and since this is true for all units, the accuracy of the resulting operation is actually greater than obtainable by each unit alone.

Now, it has to be considered that the system carefully distinguishes between individual inaccuracies on one hand and faulty operation due to defect. As stated, each auxiliary piston rod 9a, . . . , 9d, is provided with a cam (11a through 11d respectively). These cams 11a through 11d respectively operate feeler devices 12a through 12d in case the respective auxiliary pistons individually undergo a displacement that exceeds a predetermined minimum or fault threshold level. The respectively associated switch 12a through 12d is then operated in the case of an excessive auxiliary piston displacement in either direction. Upon switch actuation, the respectively associated disconnect control valves 6a through 6d turns hydraulic fluid supply off for the particular drive unit, so that the unit no longer participates in the operation.

If a drive unit, for example unit 1a, is, thus, turned off, pressure is taken away from the respective drive piston and from the sides of the respectively connected balancing and auxiliary pistons, e.g., pistons 18a and 8a. The other pistons (e.g. 18b, 18c, 18d) of the balancing system remain under pressure of the oil pool in tank 20. As a consequence, the balancing system will seek and establish a new state of equilibrium. Pursuant to that tendency to seek a new balance, balancing piston 18a, as associated with the now disconnected unit (1a), is driven by the balancing system to the uppermost, limit position. The new state of equilibrium permits continuation of balancing operation among the remaining pistons 18b, 18c, 18d and the respective drive units. Also, the respective auxiliary piston in cylinder 8a is driven to an upper limit position by hydraulic action on the other side. These two pistons (8a and 18a) respectively, of the auxiliary and secondary system remain in that limit position, while the remaining balancing and auxiliary pistons cooperate just as if the disconnected and disabled unit were not there. In particular, the remaining pistons, 18b etc. of the balancing system, monitor pressure conditions among the remaining drive cylinders in exactly the same manner as before. As one can see here very clearly, the operation of the device is effective independent from the number of units that are being supervised.

The system will operate in this manner until only two drive units remain connected. Operational averaging occurs as before, but in case of faulty operation, the system has no longer the possibility of distinguishing which unit is the faulty one. As long as three or more units remain working, the faulty one will show displacement of its auxiliary piston larger than the individual displacement of the other auxiliary pistons, and that is the criterion for disconnection. If there are only two units and auxiliary pistons, their displacement will be oppositely equal, at least approximately so, and both will run to the disconnect limit so that both of them will be disconnected. This, of course, is true only if the error is actually so large that the balancing control is not capable of causing the drive cylinder pressure to equalize.

Figure 2:
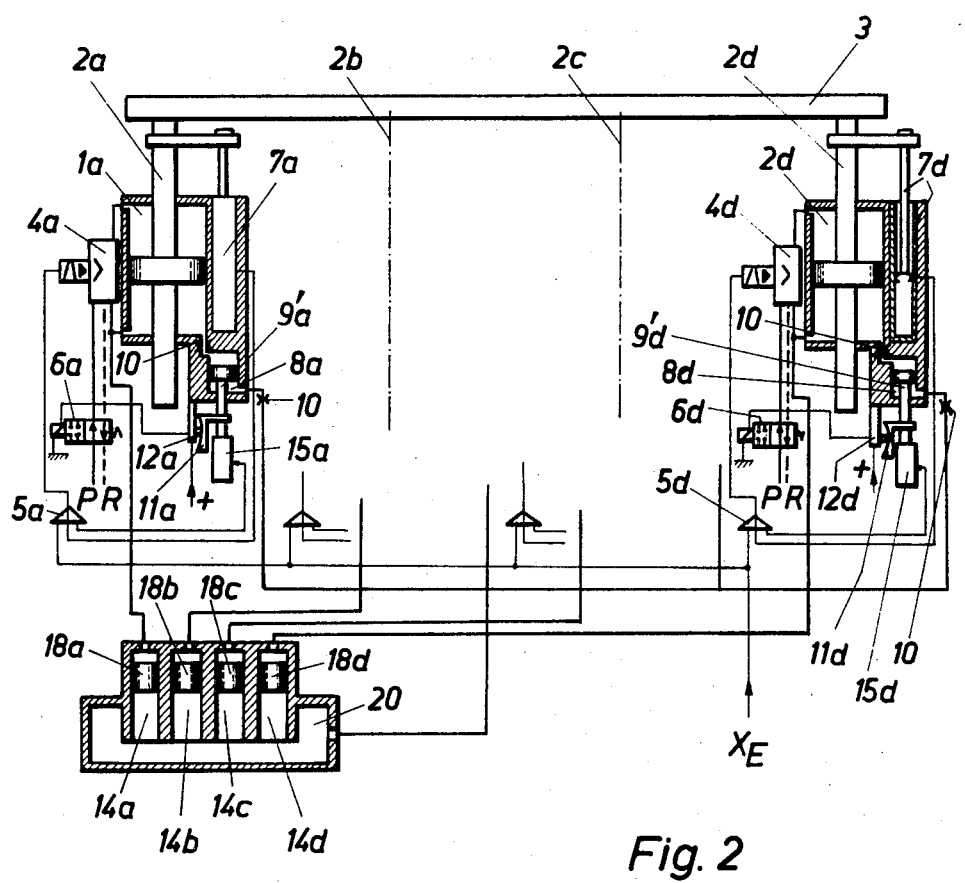
FIG. 2 is a similar view as FIG. 1 but the control apparatus employed differs.

After having described in detail the device of FIG. 1, the description of the quadruplex drive system of FIG. 2 does not require much additional elaboration. The device in accordance with FIG. 2 differs from the one in FIG. 1 in that the potentiometer resistance tracks are stationary. Thus, the position feedback transducers of the drive units are not controlled directly by the balancing system. Instead, the auxiliary piston rods 9'a through 9'd are connected to the movable contacts of additional potentiometers, respectively 15a through 15d. A respective third signal is extracted from each additional potentiometer to be used as third input signal for the comparators 5a through 5d. This third input is, of course, zero as long as the multiple drive system operates under balanced conditions. Nonzero third inputs reflect balancing operation; the sum total of the balancing signals being about zero.

The advantage of utilizating two potentiometers per unit, one for the basic feedback loop, 7a etc., the other one for balancing control 15a etc., is not only a more simple construction but different transfer functions may be provided for the position feedback control and for the balancing control so as to optimize operation, though both are part of the feedback system.

Figure 3:
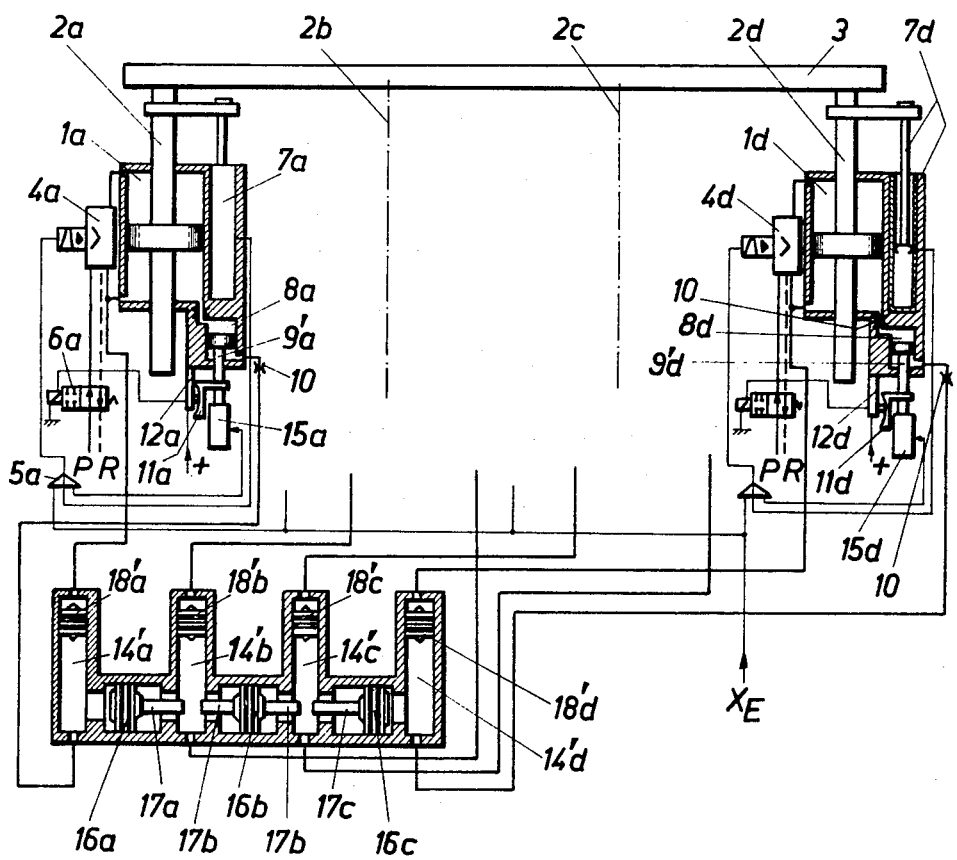
FIG. 3 shows a drive system of the type shown in FIG. 1 but with a modified hydraulic balancing system.

The quadruplex drive system in accordance with FIG. 3 is functionally similar to either system of FIG. 1 or FIG. 2. The electric circuit as to balancing and feedback control, is particularly provided as shown in FIG. 2. However, the hydraulic balancing system is constructed somewhat differently. In FIGS. 1 and 2 the secondary hydraulic system provides a single hydraulic output, acting on all auxiliary pistons. In FIG. 3, there is complete separation of the hydraulic circuit for each unit. It can be seen that each of the drive cylinders is associated with a hydraulically separate chamber 14'a, 14'b, 14'c and 14'd. The respective other side of pistons 18'a through 18'd, therein, are directly and individually connected by conduit means to the auxiliary cylinders 8a through 8d respectively.

The chambers 14'a through 14'd are interconnected mechanically without immediate and direct fluid connection; instead, floating pistons 16a, 16b, 16c, are provided between respective two of these chambers to equalize pressure and displacement operation on the side of pistons 18c to 18d, not directly connected to the cylinders of the drive units. The resulting hydraulic effect is, of course, similar in either case in that particular volume displacement on the balancing side of pistons 18'a etc. will occur in all auxiliary piston chambers 8a etc. However, one can see that separation and partitioning of the hydraulic balancing system by establishing several chambers, has the advantage of complete separation of the supervising circuits for each drive unit from all others. In other words, the supervisory circuit, as far as it affects each unit and its feedback loop, is hydraulically separated from all other units. However, the balancing system provides for pressure equalization on that side that connects to the auxiliary pistons of each unit to oppose effect of drive cylinder pressure thereof.

This fluid circuit separation is particularly important in case there is leakage in one of the units, particularly in the associated section of the hydraulic balancing system or in one of the connection of the auxiliary cylinder. Such leakage may well constitute a fault error situation the system is to compensate, and it is, of course, an important aspect that such a leakage in a portion of the supervisory system does not render the system inoperative in its entirety. Therefore, such leakage in the hydraulic part of one of the drive units, including the supervisory portion thereof, will be monitored as to possible defect and may result in its disconnection, without impairing operation and supervision of the remaining units.

Floating pistons 16a through 16c are provided with pins 17a, 17b and 17c. In case the central portions of the hydraulic balancing system leaks, or the two central units have been disconnected for any other reason, the two outer chambers 14'a and 14'c are directly interconnected through engagement of all floating pistons 16a, 16b and 16c via these pins. Thus, pressure variations as between chamber 14'a and 14'd can still be transmitted via the engaging pins of the floating pistons. In lieu of the floating pistons, pressure transfer could be had by means of deflecting membranes.

It can, therefore, be seen that by operation of the provisions in accordance with the invention, differences in pressure in the several drive cylinders may be balanced and eliminated as long as elimination is possible with a particular range. The causes for these pressure differences do not effect operation of the balancing device, but in case of a high deviation in pressure in one cylinder, the respective drive unit will be disconnected. The principle of operation is that plural feedback loops for the several drive units are interconnected by the balancing device to obtain pressure equalization through intercoupled loop action. The stability range of the multiple drive system as a whole is greatly enhanced due to damping and integration of the pressure differential with utilization of the control signal derived from the pressure difference for pressure balancing. One can see also that the invention can be used for all kinds of multiple drive units except that there must be at least three cooperating units which operate. These units may operate in parallel or in tandem.

The invention is not limited to the embodiments described above but all changes and modifications thereof not constituting departures from the spirit and scope of the invention are intended to be included.

We claim:

1. In an actuator arrangement wherein a plurality of drive units operate on a common output, each drive unit of the plurality including a piston respectively disposed in a cylinder which is pressure controlled by servo valve means, there being a source of pressure fluid for connection to the cylinders via the respective servo valve means for displacing the respective pistons therein in one or the opposite direction as determined by operation of the respective servo valve means, the combination comprising:

plural means respectively connected to each of the servo valve means for operating the servo valve means to obtain position adjustment of the pistons of the plurality in the respective cylinders of the plurality;

first means defining a hydraulic balancing system having a plurality of hydraulic inputs respectively in communication with the drive cylinders of the plurality;

second means hydraulically connected to the first means for deriving therefrom control manifestation and further connected to all of the control means for providing thereto the control manifestation to obtain operation thereof for equalizing the pressure in the drive cylinders of the plurality; and third means for disconnecting one of the cylinders if its pressure differs from the pressure in the others beyond a predetermined threshold.

2. In an arrangement as in claim 1, the first means including a plurality of cylinders with balancing piston inserted, and respectively in communication with the drive cylinders, so that each balancing piston is respectively operated by the pressure in the respectively associated drive cylinder, the balancing cylinders interconnected so that the other sides of the balancing pistons are under common pressure, operating the second means.

3. In an arrangement as in claim 2, wherein the respective balancing piston assumes a particular position in case the associated drive cylinder is disconnected.

4. In an arrangement as in claim 2, wherein the respective other sides of the balancing pistons are supported on a liquid cushion, the second means providing a common line in communication with a hydraulic secondary system operating on the control means.

5. In an actuator arrangement as in claim 1, each control means in cooperation with the respective servo valve establishing a feedback loop for position control of the respective drive piston, the first and second means operating to provide a common correction signal as control manifestation to each of the control loops, the control means each additionally receiving a variable command signal serving as a reference in each loop.

6. In an arrangement as in claim 5, there being drive piston position sensing means provided for each control means providing a position feedback signal, each control means including an auxiliary piston-cylinder, one side of the auxiliary cylinder connected to the respective drive cylinder, so that the respective auxiliary piston is acted upon by drive cylinder pressure, the other side of the auxiliary cylinder being connected by the second means to the first means, the auxiliary piston connected to a position transducer for the respective drive piston to alter the fed back signal as provided by the transducer for the respective feedback loops.

7. In an arrangement as in claim 5, wherein second means operate each control means to obtain oppositely directed control operations of one loop as compared with the others, the one loop pertaining to the drive cylinder having pressure different from the pressure in the other drive cylinders.

8. In an arrangement as in claim 5, the first means including a plurality of balancing cylinders and pistons, respectively connected to the control means of the plurality, each balancing cylinder, on one side of the respective piston therein, being under pressure of the respective drive cylinder, the respective other sides of the balancing cylinders being interconnected.

9. In an arrangement as in claim 8, wherein the respective other sides of the balancing cylinders are directly hydraulically interconnected by a common reservoir of displaceable fluid, establishing a cushion.

10. In an arrangement as in claim 8, wherein the respective other sides of the balancing cylinders are hydraulically separated but interconnected to establish and to maintain common pressure in all respective other sides of the balancing pistons.

11. In an arrangement as in claim 10, wherein the respective other sides of the balancing cylinders are hydraulically separated but interconnected through floating pistons.

12. In an arrangement as in claim 11, wherein respective two floating pistons are selectively interconnected directly in case of failure and disconnection of some of the drive cylinders, with at least two drive units remaining operational.

13. In an arrangement as in claim 1, the control means operating for obtaining pressure equalization in the drive cylinders of the plurality of units and having a particular operating range, the third means responding when a limit of the range is reached.

14. In an actuator arrangement having a plurality of drive units each including a piston and a cylinder and operating a common output, a plurality of servo valves respectively controlling pressure in the drive cylinders and for respective piston displacement therein, feedback means for each drive cylinder and piston, operating in response to each drive piston displacement, control means for each drive cylinder and piston operating in response to a common command input and in response to each respective feedback means, and an auxiliary piston for each drive unit operating under control of the pressure in the respective drive cylinder and operating the feedback means additionally, the improvement comprising:

a balancing piston associated with each drive unit and maintained under pressure from the respective drive cylinder; a common pressure means acting on the respective other side of each balancing piston and acting also on the other side of each auxiliary piston, to control the feedback means of the plurality in response to operation of the common pressure means by the balancing pistons when acted upon differently by different pressures in the drive cylinders; and means for disconnecting a unit if the associated auxiliary piston is displaced beyond a particular limit.

15. In an arrangement as in claim 14, wherein the common pressure means is a single pressure chamber in communication with auxiliary chambers for each of the auxiliary pistons.

16. In an arrangement as in claim 14, wherein the common pressure means is partitioned in a plurality of hydraulically separated chambers, mechanically interconnected to maintain equal pressure.

17. In an arrangement as in claim 14, wherein each feedback means includes a comparator connected for receiving the command signal, for receiving a signal representing the position of the drive piston, and for receiving a signal representing the position of the auxiliary piston as determined by the pressure in the respective drive cylinder and by the pressure and volume displacement of the common pressure means.

18. In an arrangement as in claim 14, wherein the feedback means for each unit includes a potentiometer with adjustable tap and adjustable resistive track, one thereof connected to the drive piston, the other one connected to the auxiliary piston to be acted upon by the pressure in the common pressure means.

* * * * *